United States Patent [19]

Shutt

[11] 4,212,625
[45] Jul. 15, 1980

[54] HIGH SPEED INJECTOR FOR MOLDING MACHINES

[76] Inventor: George V. Shutt, 918 Willow Springs La., Glendora, Calif. 91740

[21] Appl. No.: 886,407

[22] Filed: Mar. 14, 1978

[51] Int. Cl.$^2$ .............................................. B29F 1/03
[52] U.S. Cl. ................................... 425/549; 425/548; 425/552; 425/566
[58] Field of Search ............... 425/549, 566, 568, 569, 425/548, 552

[56] References Cited

U.S. PATENT DOCUMENTS

| 2,814,831 | 12/1957 | McKee | 425/568 |
| 3,103,039 | 9/1963 | Robinson | 425/549 |
| 4,013,393 | 3/1977 | Gellert | 425/571 X |
| 4,017,242 | 4/1977 | Mercer | 425/549 C |
| 4,043,740 | 8/1977 | Gellert | 425/566 X |
| 4,094,447 | 6/1978 | Gellert | 425/570 X |
| 4,125,352 | 11/1978 | Gellert | 425/549 X |

FOREIGN PATENT DOCUMENTS 46-18627  5/1971  Japan ......................... 425/568

Primary Examiner—Thomas P. Pavelko
Attorney, Agent, or Firm—Lloyd Spencer

[57] ABSTRACT

An injector for molding machine capable of operation with a simple mold having few cavities at a total cycle of as little as one to five seconds, thereby accomplishing high speed production with a minimum number of mold cavities; the injector having a nozzle structure so arranged as to minimize heat transfer to the mold whereby the mold may be maintained at a temperature to effect rapid cooling and ejection of the molded part, while the molding material in the nozzle is maintained in a fluid condition; the rapid cycle of operation serving to maintain the desired nozzle temperature, also.

4 Claims, 8 Drawing Figures

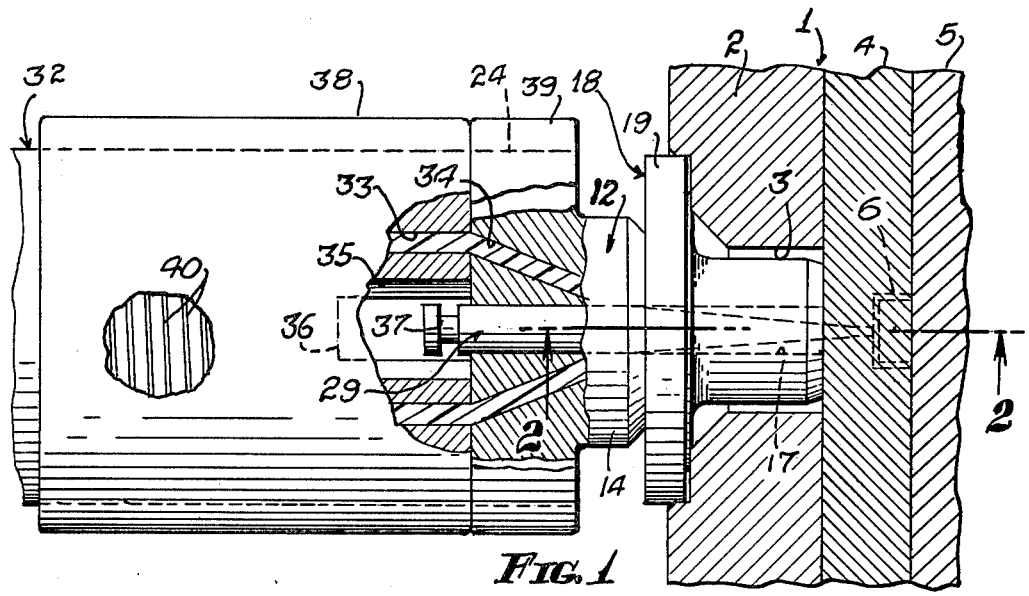
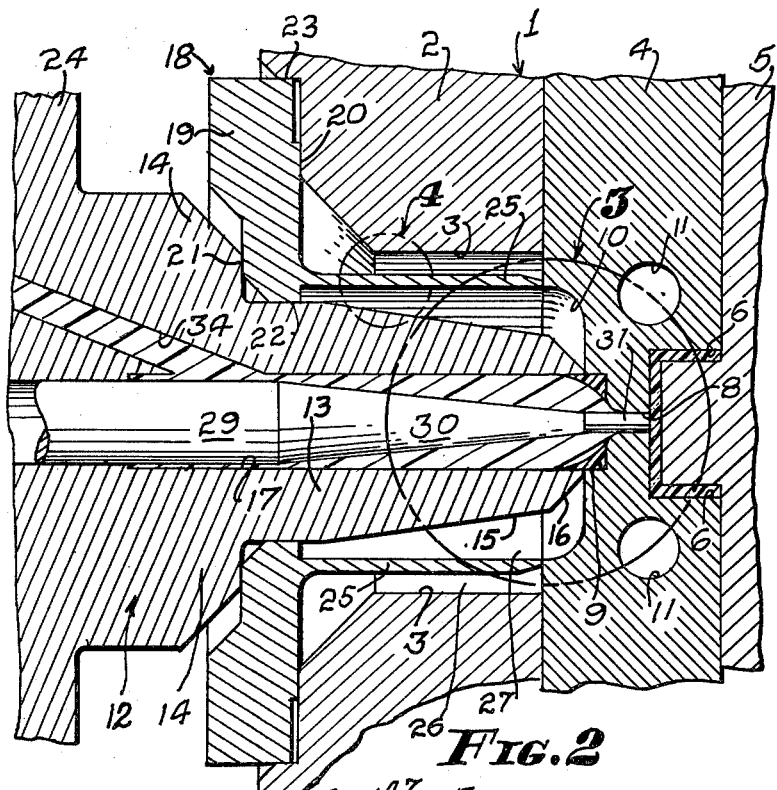
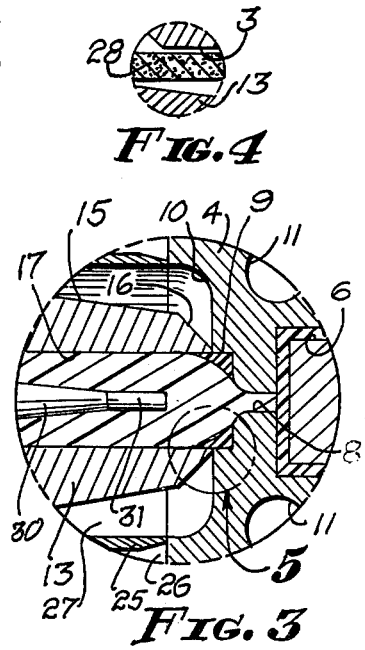
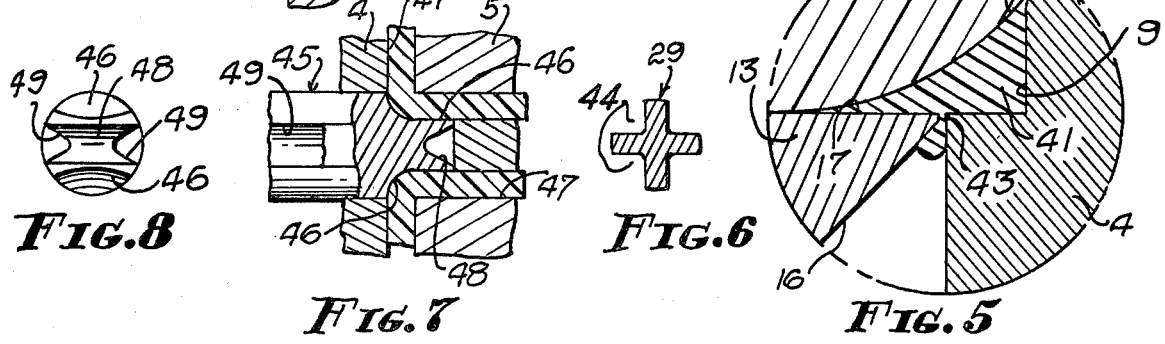

HIGH SPEED INJECTOR FOR MOLDING MACHINES

BACKGROUND AND SUMMARY

Conventional molding of small parts in large quantity at economic cost has required expensive molds with many cavities, material wasting sprues and complex runners. The present invention is directed to a high speed injector for molding machines to minimize the duration of the molding cycle thereby increasing the number of parts produced per unit of time, and is summarized in the following objects:

First, to provide a molding machine injector intended primarily for use on molding machines having inexpensive molds of small capacity, as for example one to four cavities, for producing parts having relatively thin walls and sufficiently low mass as to undergo rapid cooling to a solid state.

Second, to provide a molding machine injector capable of an extremely fast operation cycle, in the order of one to five seconds, depending mold and injected material characteristics.

Third, to provide a molding machine injector which includes a nozzle having heat transfer retarding means so arranged as to readily maintain the molding material at the most uniform temperature practical, maintaining fluid flow while avoiding excessive heating of the material.

Fourth, to provide a molding machine injector, the nozzle of which is maintained in close proximity to the entrance of the mold utilizing a small accumulation of essentially solidified molding material to effect a seal and a flow control pin within the nozzle is movable to a retracted position, for flow of the molding material into the mold cavity and an extended position closing the mold entrance with it's tip end flush with a surface of the mold cavity to produce a finished part free of any sprue, runner or other excess material.

BRIEF DESCRIPTION OF THE DRAWINGS

FIG. 1 is a fragmentary, partial sectional, partial elevational view of the molding machine injector and adjacent portions of the molding machine.

FIG. 2 is an enlarged framentary sectional view therof taken through 2—2 of FIG. 1, showing the compontents as they appear on completion of the injection phase of the molding cycle.

FIG. 3 is an enlarged fragmentary sectional view therof taken within Circle 3 of FIG. 2, showing the components as they appear during the injection phase of the molding cycle.

FIG. 4 is a fragmentary sectional view defined by Circle 4 of FIG. 2 showing a modified temperature control sleeve.

FIG. 5 is an enlarged sectional view taken within Circle 5 of FIG. 3 illustrating the manner in which a seal is maintained between the nozzle tip and the mold.

FIG. 6 is a transverse sectional of a modified shut off pin.

FIG. 7 is an enlarged fragmentary view showing the end of a modified shut off pin and adjacent portions of the mold unit.

FIG. 8 is an end view of the modified shut off pin shown in FIG. 7.

DETAILED DESCRIPTION

The injector for the molding machine is used in conjunction with mold unit 1, which includes a mounting plate 2 having a clearance bore 3. Secured to one side of the mounting plate 2 is a front mold member 4 which overlies the bore 3. The plate 2 and mold member 4 may be integral, in which case the bore 3 would become a clearance recess. Rearwardly of the front mold member 4 is a back mold member 5. The two mold members form one or few mold cavities, represented by 6, and define a parting plane 7.

The front mold member 4 is provided with a small entrance bore 8 which intersects the mold cavity 6. The bore 8 is centered with respect to the clearance bore 3 and is bordered by a shallow recess 9 which, in turn, is bordered by a shallow peripheral recess 10. The mold unit 1 is provided with coolant circulation passages 11 contiguous to the mold cavity 6.

The injector includes a nozzle member 12 having a nozzle stem 13 received in the clearance bore 3 and a flange 14 which overlies but which is spaced from the front side of mounting place 2. Externally, the nozzle stem 13 includes a tapered portion 15, which at it's extremity, is further tapered to form a beveled portion 16. The stem 13 has a central bore 17 which intersects the beveled portion 16 to form a circular line confrontation with the periphery of the inner recess 9.

Interposed between the flange 14 and the mounting plate 2 is a temperature isolation member 18 which includes a flange 19 having a radially outer bearing surface 20 which engages the plate 2; and also having a radially inner bearing surface 21 which is engaged by the nozzle flange 14. In addition, the flange 19 is provided with a radially inner guide surface 22 and a radially outer guide surface 23.

The nozzle member 12 includes a second flange 24 axially offset from and extending radially beyond the flange 14. The bearing surfaces 20 and 21 and the guide surfaces 22 and 23 have minimum contact area to minimize heat transfer from the nozzle member 12 to the plate 2.

The temperature transfer reduction member also includes a thin wall sleeve 25 attached to the flange 19 and extending between the plate 2 and the nozzle stem 13 to form therewith a radially outer air chamber 26 and a radially inner air chamber 27. Alternatively, the sleeve 25 may be of increased thickness and formed of porous ceramic material, as indicated by 28 in FIG. 4, or the entire temperature transfer reduction member 18 may be so formed.

The bore 17 of the nozzle member 12 receives a shut off pin 29 having a tapered portion 30 terminating in a sealing tip 31. The pin is moved between a shut off position showm in FIG. 2 in which the extremity of the tip 31 is flush with the mold cavity surface; and a retracted position shown in FIG. 3 to permit flow of molding material into the mold cavity 6.

The nozzle member 12 is secured by it's flange 24 to a ram 32 shown fragmentarily, which is conventional. The ram is hydraulically operated and applies pressure to the nozzle member 12 and temperature transfer reduction member 18 to maintain these members in place. Also the ram 32 is connected to a conventional source of pressurized and heated molding material, not shown. The ram 32 is provided with flow passage 33 for the molding material which is connected with the central bore 17 of the nozzle member 13 through converging passages 34 within the flanged end of the nozzle member 12.

Centered in the ram 32 is a clearance passage 35 into which the inner end of the shut off pin 29 extends. A side opening 36 is provided in the ram 32 exposing the inner end of the shut off pin 29 which has an annular channel 37 to receive a hydraulically operated arm, not shown, for advancing and retracting the shut off pin. The ram 32 and the flange 19 are provided with appropriate heating sleeves 38 and 39 having electrical heating elements 40.

It is preferred that when pressure is applied by the ram 32 against the flange 24 of the nozzle member 12 some clearance be provided between the extremity of the sleeve 25 and the confronting mold member 4. Such space has minimal effect on the function of the air chambers 26 and 27. A similar clearance space is preferred between the end of the nozzle stem 13 and mold member 4. Referring to FIG. 5, the recess 9 provides a space to entrap and retain a small ring of molding material, indicated by 41, which has been found to solidify sufficiently to form a smooth transition surface 42. In addition, some of the material fills and seals the clearance space as indicated by 43.

Operation of the injector for the molding machines is as follows:

Referring to FIG. 3, the molding material, which is represented as a plastic material, is in a fluid state in the bore 17 and in the mold cavity 6, except the transition portion 41. The shut off pin 29 is still in its retracted position. The molding material is being subjected to the cooling effect of the mold members during injection, however, before the molding material solidifies, the shut off pin 29 is moved to its closed position shown in FIG. 2. The mold member 5 then separates from the mold member 4 and the molded part is ejected by conventional means.

The rate at which parts are produced is related to many factors including the mass and thickness of the part or parts produced from each cycle. Successful molding of parts having a mass approximating 1/16 ounce and with wall thickness of approximately 0.040 inch has been accomplished in a molding cycle of less than two seconds. Because of the small mass and mechanical stress on the molding machine as a whole is minimal, continuous operation for weeks or months without stopping is reliable and practical, even at such fast cycle rates. Assuming a two second cycle and a mold with just two cavities, continued operation will produce 604,800 parts per week, which is the equivalent of a typical 30 cavity mold costing approximately 5 times as much, used on a molding machine costing many times as much as the small machines used with this invention, and having a typical cycle rate of a 30 second cycle. While a twin cavity mold is selected as an example, the most feasible number ranges from one to four.

Because of the high cycle frequency, the cooling effect of the mold temperature (typically 50 to 60 degrees F.) on the nozzle (typically 400 to 500 degrees F.) is minimal and essentially constant. The frequent flow of new melted material from the warmer portion farther away from the tip of the nozzle, toward the tip tends to maintain the nozzle tip at the preferred essentially constant temperature. Also due to the frequent flow and the greatly reduced time a given portion of the melted molding material is subjected to the cooling effect of the cooler nozzle tip, the melted material tends to still be near the higher temperature found farther from the tip of the nozzle, upon injection into the cavity to produce the part. Plastic molding materials especially benefit from this characteristic, because they both heat and cool slowly, because of their insulating properties. With conventional relatively long cycle molding, a portion of the molding material will be at an a excessive temperature, so that the coldest portion will still be adequately fluid to allow injection. The time required to cool the molding material is very dependant upon the temperature of the hottest portion of the injected material. These factors accent each other, and the longer cooling cycle in turn results in wider differentials in the injected molding material temperature, again calling for longer cooling to cool the hottest portion. It can readily be ascertained that the sleeve 25 and air chambers 26 and 27 are a vital factor in avoiding the longer cycles and temperature variations noted.

During operation of the injector and molding machine, the nozzle member 12 and ram 32 remain fixed, however, the ram is hydraulically operable for the movement of the nozzle member between the position illustrated and a retracted position for servicing the machine or changing the mold. When the nozzle member is retracted, the shut off pin 29 is accessable from the exposed end of the bore 17, without the very time consuming necessity of removing the nozzle, to replace the shut off pin 29, as is customary with the only conventional design presently known to applicant. The relative times of shut off pin replacement are less than one minute for the immediate invention, and over one full hour with conventional construction. With the conventional construction, the mold must also be removed for the replacement of the shut off pin. Some of the more fragile shut off pin design, must be necessity be replaced during a molding run due to breakage. This feature is also valuable when different molds are used on the same machine.

As shown in FIG. 4, the shut off pin 29 may be provided with longitudinal channels 44 in its tapered portion 30 to increase the volume of molding material surrounding the pin which aids in maintaining the desired temperature.

Refering to FIG. 7 and 8 which illustrate a modified shut off pin 45 in which the tip end is provided with diametrically opposed recesses 46 which compliment a pair of adjacent mold cavities 47, each recess forms a small portion of the corresponding cavity wall when the pin 45 is in its closed position shown in FIG. 7.

In addition to the recess 46, the pin 45 is provided with a cross channel 48 which may conform to or approximate the extremity of each recess 46. The cross channel 48 thus serves to eliminate excess molding material from the part being molded as the cross channel 48 allows the excess to be forced back into the nozzle cavity when the hydraulic pressure forcing the plastic thru the nozzle into the mold cavity 6 is removed simultaneously with the nozzle pin 29 being hydraulically actuated to close the mold cavity entrance 8. The channel 48 then serves to retain the molding material.

To aid such retention, the radial extremities of the cross channel 48 intersect diametrically disposed longitudinal channels 49 which become filled with molding material. Due to the fact that the tip of the pin is in contact with the cooled mold for a substantial portion of each mold cycle, and exposed to the molding material subjected to the cooling effect of the mold unit, the molding material tends to solidify and be retained in the cross channel 48 and the longitudinal channels 49. This retention may be further aided, optionally, by providing the channels 48 and 49 with a rough surface.

A consequence of inadequately cooling the tip of the shut off pin where it provides the final portion of the surface of the molded part is that the melted molding material will fail to cool adequately before the part is ejected, resulting in strings of melted molding material extending from that point upon ejection, or pulling a hole through the part or other undesirable defects. The reduction in nozzle pin 29 cross section resulting from longitudinal slots 49, helps to minimize heat transfer to the tip of pin 29, while maintaining the maximum flexural strength to minimize breakage.

The molding materials thus far considered are in a fluid state only when heated and in a solid state when subsequently cooled. Thermoset elastomeric materials are transfered by heat curing from an initial fluid or putty-like state to a solid but elastic state. If the required curing cycle of an elastomeric material is of relatively short duration, the injector and its molding machine herein described, may be utilized. In such case, the uncured material may be fed through the injector at ambient temperature; however, some heating may be provided, if kept below full curing temperature. Some elastomeric materials have sufficient strength after partial curing to be ejected from the mold without damage, and curing is completed out of the mold.

In the injection and molding of elastomeric material, minimal heat transfer is also desired, although the heat transfer may be in the opposite direction; that is, from the mold to the injector.

Having fully described my invention, it is to be understood that I am not to be limited to the details herein set forth, but my invention is of the full scope of the appended claims.

I claim:

1. A molding machine comprising:
  a. a mold unit having a mold cavity, means for cooling the mold cavity, an exposed wall surface, and an entrance bore intersecting the exposed wall surface and the mold cavity;
  b. a heated nozzle structure having a supply bore and an external surface tapering into close proximity to the periphery of the supply bore to form a nozzle tip of minimum area confronting the exposed wall surface in closely spaced relation thereto, thereby to minimize heat transfer from the nozzle structure to the mold unit and avoid axial compressional load on the nozzle tip;
  c. the tapered external surface and confronting wall surface diverging radially outward thereby further minimizing heat transfer from the nozzle structure to the mold unit;
  d. means for supplying molding material in a fluid state to the supply bore for transfer to the mold cavity;
  e. the extremity of the supply bore forming with the contiguous portion of the wall surface a zone entrapping sufficient molding material to form an internal transistion surface merging into the surface of the entrance bore;
  f. the closely spaced relation between the wall surface and the nozzle tip permitting limited discharge of molding material between the diverging end surfaces of the nozzle structure and confronting wall surface while maintaining a seal.

2. A high speed injection molding machine, comprising:
  a. an injection mold unit having a mold cavity, circulation passages for temperature transferring fluid, a wall surface, and an entrance bore intersecting the wall surface and the mold cavity;
  b. a nozzle structure having a supply bore for discharge of molding material, in a fluid state, and a conical end portion converging toward the supply bore to form therewith a discharge end of approximately zero wall thickness;
  c. the discharge end being in contiguous spaced relation to the wall surface of the mold unit for delivery of the molding material to the entrance bore of the mold unit, the spacing being sufficiently large to permit passage of molding material to form a seal;
  d. a wall surrounding the nozzle structure and forming therewith an annular insulating chamber increasing in radial dimension toward the discharge end of the nozzle structure;
  e. the discharge end portion of the nozzle structure and adjacent wall surface within the boundries of the supply bore defining an annular entrapment zone for receiving a preselected quantity of molding material forming a heat transfer shield; and
  f. a shut-off pin slidable in the supply bore and including a valve tip slidably received in the entrance bore, the shut-off tip being movable between a retracted position permitting injection of molding material through the entrance bore into the mold cavity, and an extended position closing the entrance bore.

3. A molding machine, comprising:
  a. a supporting plate having at least one clearance chamber extending therethrough;
  b. a pair of mold plates disposed in mutual contact and defining at least one mold cavity having an access bore exposed to an end of the clearance chamber;
  c. a thin wall temperature transfer reducing sleeve extending through the clearance chamber in spaced relation to the walls thereof to form a radially outer and radially inner insulating chambers;
  d. a nozzle member extending through the sleeve in spaced relation therewith and having a supply bore aligned with the mold access bore;
  e. the nozzle member including an externally tapered tip portion increasing the radial dimension of the inner insulating chamber and forming an annular discharge end of minimal area;
  f. means for positioning the discharge end of the tip portion in close but spaced relation to the surface of the mold plate surrounding the mold access bore thereby avoiding axial load on the nozzle tip member, the spacing being sufficiently large to permit of molding material to form a seal;
  g. the mold plate having a recess approximating the diameter of the nozzle bore and defining therewith in the region including the space between the nozzle tip and the mold plate to form an annular entrapment zone of molding material thereby to form an internal transition path to the access bore.

4. A high speed injection molding machine, comprising:
  a. an injection mold unit having a mold cavity, circulation passages for temperature transferring fluid, a wall surface, and an entrance bore intersecting the wall surface and the mold cavity;

b. a nozzle structure having a supply bore for discharge of molding material, in a fluid state, and a conical end portion converging toward the supply bore to form therewith a discharge end of approximately zero wall thickness;

c. the discharge end being in contiguous spaced relation to the wall surface of the mold unit for delivery of the molding material to the entrance bore of the mold unit, the spacing being sufficiently large to permit passage of molding material to form a seal;

d. a wall surrounding the nozzle structure and forming therewith an annular insulating chamber increasing in radial dimension toward the discharge end of the nozzle structure;

e. the discharge end portion of the nozzle structure and adjacent wall surface within the boundries of the supply bore defining an annular entrapment zone for receiving a preselected quantity of molding material forming a heat transfer shield; and f. A shut-off pin having a tip dimensioned to fit the access bore, the pin being movable between a first position permitting flow of the molding material into the mold cavity and a second position closing the access bore.

* * * * *